United States Patent [19]  [11] Patent Number: 5,719,971
Smith  [45] Date of Patent: Feb. 17, 1998

[54] STRAIN BASED OPTICAL FIBER SYSTEMS

[75] Inventor: Ronald H. Smith, Chevy Chase, Md.

[73] Assignee: Optelecom, Inc., Gaithersburg, Md.

[21] Appl. No.: 622,019

[22] Filed: Mar. 26, 1996

Related U.S. Application Data

[63] Continuation-in-part of Ser. No. 370,245, Jan. 9, 1995, Pat. No. 5,502,782.

[51] Int. Cl.$^6$ .................................................. G02B 6/26
[52] U.S. Cl. ........................ 385/17; 385/7; 385/1; 385/4; 385/10
[58] Field of Search .................. 385/17, 7, 1, 4, 385/10, 27

[56] References Cited

U.S. PATENT DOCUMENTS

| | | | |
|---|---|---|---|
| 3,858,437 | 1/1975 | Jarzynski et al. | 73/67.5 |
| 4,068,191 | 1/1978 | Zemon et al. | 331/94.5 |
| 4,328,569 | 5/1982 | Troit et al. | 367/103 |
| 4,477,723 | 10/1984 | Carome et al. | 250/227 |
| 4,753,507 | 6/1988 | De Paula et al. | 350/96.15 |
| 4,793,676 | 12/1988 | Risk | 385/4 |
| 4,872,738 | 10/1989 | Risk et al. | 385/1 |
| 4,907,856 | 3/1990 | Hickernell | 350/96.29 |
| 4,991,923 | 2/1991 | Kino et al. | 350/96.15 |
| 4,996,692 | 2/1991 | Kabacoff | 372/26 |
| 5,002,349 | 3/1991 | Cheung et al. | 385/1 |
| 5,054,873 | 10/1991 | Davis et al. | 385/27 |
| 5,119,447 | 6/1992 | Trisno | 385/3 |
| 5,159,601 | 10/1992 | Huber | 372/6 |
| 5,191,586 | 3/1993 | Huber | 372/6 |
| 5,247,593 | 9/1993 | Lin et al. | 385/17 |
| 5,400,171 | 3/1995 | Song | 385/7 |
| 5,502,782 | 3/1996 | Smith | 385/7 |

OTHER PUBLICATIONS

High–Performance Optical Analog Link Using External Modulator, G.E. Betts et al, IEEE Photonics Technology Letters, vol. 1, No. 11, Nov. 1989, pp. 404–406.

Growth of Bragg Gratings Produced By Continuous–Wave Ultraviolet Light In Optical Fiber, H. Patrick & S. L. Gilbert Optics Letters, vol. 18, No. 18, Sep. 15, 1993.

New Design Concept for a Narrowband Wavelength–Selective Optical Tap and Combiner, Electronic Letters, vol. 23, pp. 668–669, by D.C. Johnson et al, Apr. 1987.

*Primary Examiner*—Phan T. H. Palmer
*Attorney, Agent, or Firm*—William L. Feeney; Kerkam, Stowell, Kondracki & Clarke, P.C.

[57] ABSTRACT

Optical systems use tuning of in-fiber gratings to provide an optical crossbar switch matrix of switch elements. The switch elements have a drop tap and an insert tap. A combination of the switch matrices provides a flexible way of connecting any of a plurality of transmitters with any of a plurality of receivers. A distribution arrangement has a distribution station with a plurality of serially arranged modulators, each modulating a different and corresponding optical carrier supplied by optical fiber thereto. The modulated carriers are supplied by a distribution fiber to a serially arranged plurality of passive taps, each of which drops an optical carrier corresponding to the tap and supplies it to a local transceiver. The distribution arrangement may include an arrangement where a local transceiver reflects back the modulated optical carrier and modulates it with a return signal. A correlator at the distribution station detects which of several local transceivers a reflected return modulated optical carrier came from by using a time delay corresponding to the round trip transit time of the optical carrier between the distribution station and the given local transceiver. A modulation arrangement using a drop-insert tap which drops an optical carrier, modulates it, and reinserts it after providing optional amplification.

4 Claims, 6 Drawing Sheets

STRAIN BASED OPTICAL FIBER SYSTEMS

The present application is a continuation-in-part (CIP) application based on the present inventor's copending U.S. application entitled FOCUSED ACOUSTIC WAVE FIBER OPTIC REFLECTION MODULATOR, Ser. No. 08/370, 245, filed Jan. 9, 1995, which will issue Mar. 26, 1996 as U.S. Pat. No. 5,502,782. Another U.S. CIP application based on that application is being filed concurrently herewith in the name of the present inventor and entitled STRAIN BASED OPTICAL FIBER DEVICES. Those two applications are both assigned to the assignee of the present application and are hereby incorporated by reference.

BACKGROUND OF THE INVENTION

The present invention relates to optical fiber systems in which strain is applied to change the optical path of a region of an optical fiber having an in-fiber grating therein. More specifically, the present invention relates to such optical fiber communications systems useful as optical switching arrays, pairs of switching arrays, optical signal distribution networks, bidirectional communications units and drop/insert arrangements.

The present inventor's above referenced application Ser. No. 08/370,245 as U.S. Pat. No. 5,502,782 shows a device configuration which produces an optical path length change through the action of transient strain induced by an acoustic wave passing through the fiber core. The changes in optical path length occur in a grating portion of an optical fiber, which portion houses an in-fiber grating. The changes in optical path lengths modify the spectrum characteristics of the in-fiber gratings and are used in constructing modulators, interferometers, transceivers, optical switches, drop/insert devices (which drop one or more optical signals and add one or more optical signals), and optical fiber networks. (No admission is made herein that the application Ser. No. 08/370,245 as U.S. Pat. No. 5,502,782 is prior art to the present application.)

Although the inducement of strain in optical fibers with in-fiber gratings has been accomplished by various techniques, the figures of merit provided by these techniques have generally been quite limited. (The figure of merit will be understood as representative of the amount of change in optical characteristics of an optical fiber device.) The limits on the various strain inducing techniques have in turn limited the amount of change which can be produced in the optical characteristics of in-fiber gratings. This has in turn limited the applications of devices having strain inducing techniques. The incorporated by reference concurrently filed application titled STRAIN BASED OPTICAL FIBER DEVICES shows various strain inducing techniques for providing improved figures of merit. (No admission is made herein that the concurrently filed application is prior art to the present application.)

In various optical fiber networks, it is useful to be able to optically switch signals entering an optical switch so that some or all of the signals are selectively blocked by diversion to a branching optical path. Although various optical switches and combinations of optical switches have previously been used as part of a network, such switches and combinations thereof have often been subject to one or more of various disadvantages. Often, such arrangements have limited flexibility when dealing with multiple input and/or output fibers. Complex switches and complex arrangements have often been required. Reliability and avoidance of cross talk (i.e., leakage of low level signals to fibers from which the signals should be blocked) are often less than desirable.

Distribution arrangements for optical signals have often been complex and inefficient. Especially complex are often those arrangements and systems such as transceivers used for bidirectional communication.

Drop and insert arrangements have been often subject to various disadvantages including selectivity limitations (i.e., ability to block a signal without blocking or reducing in strength another signal close in wavelength to the blocked signal), complexities in device and system design, and introduction of loss in the level of signals passing therethrough. Some such arrangements have required conversion of optical signals into electrical signals and back into optical signals with associated power requirements and complexities.

OBJECTS AND SUMMARY OF THE INVENTION

Accordingly, it is a primary object of the present invention to provide new and improved optical fiber systems.

More specific objects of the present invention are to provide an optical fiber switch, array of switches, and systems using the switches and arrays.

A further object of the invention to provide an improved optical fiber signal switch.

Another object of the invention is to provide a wide tuning range for optical fiber signal switch wavelengths.

A further object of the present invention is to provide optical fiber systems with great flexibility and adaptability in their ability to selectively direct signals from one of several input fibers to one or more of several output fibers.

Yet another object of the present invention is to provide optical switches and optical fiber switching systems with the ability to provide good selectivity, minimal or no cross talk, high reliability, and using relatively simple arrangements.

Providing identical strain-based optical fiber switches in the two arms of a Mach-Zehnder fiber interferometer creates a Michelson fiber interferometer at the wavelength to which the in-fiber gratings are tuned. This Michelson fiber interferometer can be adjusted to reflect virtually all of the optical signal at a selected wavelength incident via one fiber connected to a first directional coupler of the Michelson fiber interferometer back through the directional coupler and out the second fiber connected to the directional coupler. This arrangement produces a wavelength selective optical tap. A second Michelson fiber interferometer exists which is formed by the in-fiber gratings and the second directional coupler of a Mach-Zehnder fiber interferometer. This Michelson fiber interferometer provides a path for inserting optical signals at the selected in-fiber grating wavelength. Either of the two Michelson fiber interferometers can convey bidirectional signals at a selected wavelength into and out of an optical fiber transmission line connected to the Mach-Zehnder fiber interferometer. As will be appreciated by those of skill in the art, and as apparent from the incorporated-by-reference parent application, such an interferometric tap requires single mode fibers.

The above and other features of the present invention which will be more readily understood when the following detailed description is considered in conjunction with the accompanying drawings are realized by an optical system including: a first crossbar switch matrix having a plurality of switch elements in an M by N array, each switch element operable for switching optical signals; a plurality of first matrix input fibers connected to carry input signals to the first crossbar switch matrix; and a plurality of first matrix output fibers connected to carry output signals from the first crossbar switch matrix. Each switch element includes a drop tap operable to drop signals from passage between a drop tap input fiber and a drop tap output fiber such that any dropped signals are applied to a drop tap drop fiber for placement onto one of the first matrix output fibers corresponding to the given switch element. At least a plurality of the switch elements includes an insert tap operable to pass signals from an insert input fiber to an insert output fiber other than signals within a blocked bandwidth. Signals within the blocked bandwidth are supplied to the insert output fiber via the drop fiber of the corresponding drop tap and an insert fiber of the insert tap.

The present invention may alternately be described as an optical system including a distribution station having a plurality of optical carriers on a fiber with the fiber inputting the signals to a plurality of modulators arranged in series. Each modulator modulates at least one of the plurality of optical carriers. A distribution fiber receives the modulated optical carriers and carries them to a plurality of taps arranged in series, each tap removing at least one of the modulated optical carriers.

The present invention may alternately be described as an optical system including: a distribution station having a modulator modulating an outgoing optical carrier with a modulation signal, a delay through which the modulation signal passes, and a correlator having the delayed modulation signal as a first input; a distribution fiber; and a transceiver station connected to receive the modulated optical carrier via the distribution fiber. The transceiver station has a reflector reflecting a portion of the modulated optical carrier and a modulator receiving the modulated optical carrier and imposing a return modulation on the modulated optical carrier. The return modulated optical carrier is supplied to the distribution station and the distribution station operable to recover the original modulation signal with the return modulation therewith. The correlator has a second input which is the original modulation signal with the return modulation therewith. The return modulation is recovered as an output of the correlator by adjusting the time delay of the delay so as to correspond to a round trip transit time of the optical carrier.

The present invention may alternately be described as an optical system including: a drop-insert tap having input, output, drop, and insert fibers, the input fiber operable to receive an optical carrier which is placed on the drop fiber by the drop-insert tap; and a modulator connected to the drop fiber and operable to modulate the optical carrier and provide the modulated optical carrier to the insert fiber such that the drop-insert tap places the modulated optical carrier on the output fiber.

BRIEF DESCRIPTION OF THE DRAWINGS

The above and other features of the present invention will be more readily understood when the following detailed description is considered in conjunction with the accompanying drawings wherein like characters represent like parts throughout the several views and in which.

DETAILED DESCRIPTION

Figure 1:
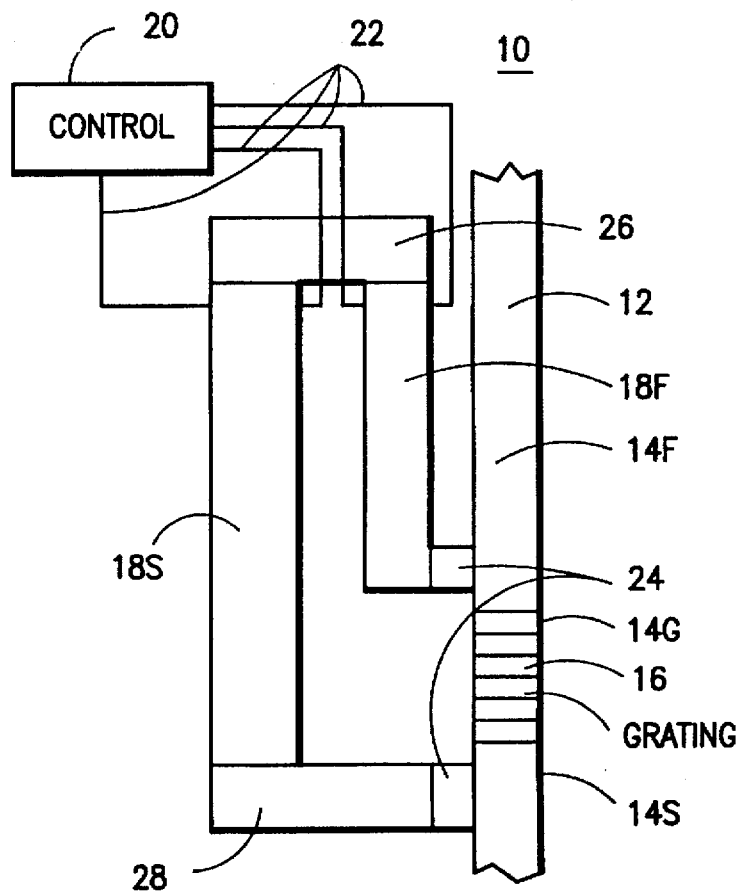
FIG. 1 is a simplified side view of a device used with the present invention.

Before discussing FIG. 1, it is noted that numerous devices and systems are disclosed herein. The components in FIG. 1 are two digit numbers. To avoid unnecessary repetition, the components of FIG. 2 will be numbered in the 100 series with the same last two digits as the corresponding components, if any, in FIG. 1. In similar fashion, the additional Components of FIG. 3 will be numbered in the 200 series with the same last two digits as the corresponding components, if any, in the first or second FIGS. The pattern continues for the other figures up to and including FIG. 6. Except for differences shown, discussed, or readily understood from the context, all components with the same last two digits in FIGS. 1-6 will be constructed and operate the same.

The fiber optic device 10 of FIG. 1 includes an optical fiber having first and second regions 14F and 14S respectively. The regions are separated by grating portion 14G of the fiber in which a Bragg diffraction in-fiber grating 16 is disposed in the light guiding core (core not separately shown). The optical characteristics (such as reflection spectra) of the grating are modified to realize optical devices such as the modulators, interferometers, transceivers, optical switches, drop/insert devices (which drop one or more optical signals and add one or more optical signals), and optical fiber networks disclosed in the incorporated by reference parent application to the present application and/or to realize the various optical systems disclosed hereafter.

The arrangement of FIG. 1 provides for mechanical leverage such that the strain applied to the grating portion 14G and the grating 16 therein may be higher than would otherwise be the case. This allows for a higher figure of merit corresponding to a greater change in the optical characteristics of the grating. For example, the arrangement can produce an expanded grating spectrum tuning range.

The mechanical leverage arrangement of FIG. 1 uses first and second strain inducing members 18F and 18S respectively, which members may for example be piezoelectric bars powered by an adjustable electric power source 20 functioning as a strain controller and using wires 22. The piezoelectric bars may more specifically be piezoelectric devices operated in the D31 excitation mode such that their lengths change, the lengths being parallel to the lengthwise direction of the fiber 12.

First member 18F is fixed at an applicator end (lower end in FIG. 1) to the first region 14F immediately adjacent the edge of the grating portion 14G as by bonding material 24. A remote end (upper end in FIG. 1) of the first member 18F is fixed to a remote end (upper end in FIG. 1) of the second member 18S as by rigid or essentially rigid connecting block 26. An applicator end (lower end in FIG. 1) of second member 18S is fixed to the first region 14F immediately adjacent the edge of the grating portion 14G as by rigid or essentially rigid connecting block 28 and bonding material 24.

As used herein, the applicator end of a strain inducing member will be the end closest to where the member applies force to the fiber, whereas the remote end will be the opposite end. For arrangements where both ends of a strain inducing member are equally removed from the application of force to the fiber, either end may be considered as an applicator end and the opposite end may be considered as the remote end. As used herein, immediately adjacent means within one cm of the edge of the grating portion.

The strain inducing member 18F is used for pulling the fiber at bonding material 24 on region 14F as member 18F pulls its ends towards its center when the strain controller 20 supplies appropriate power to piezo member 18F. The second strain inducing member 18S is used to push blocks 26 and 28 apart by increasing in length when controller 20 supplies appropriate power to piezo member 18S. Because of the connections between members 18F and 18S and fiber 14, the strain applied to grating portion 14G depends on the strain within both members 18F and 18S and is greater than the strain caused by operation of either of the members 18F and 18S under control of controller 20.

A simplified example (with numbers made up for illustrative purposes only based on ease of explanation and computation) may best demonstrate how the FIG. 1 arrangement provides an increased amount of strain in the grating portion (thereby providing an increased figure of merit). Suppose members 18F and 18S are respectively 10 cm long and 12 cm long and grating portion is 2 cm long. If member 18S can change its length by 0.12 cm corresponding to one percent length change and member 18F can change its length by 0.1 cm corresponding to one percent length change. By virtue of the connections to the optical fiber 12, the strain is concentrated at the grating portion 14G. The application of both the pulling and pushing strain by the two members 18F and 18S will cause the total length change of 0.22 cm to be applied to the 2 cm grating portion, which is greater than a ten percent length change. Basically then, the strain is concentrated by a mechanical leverage arrangement. The strain in the grating portion 14G in such an example would be 0.11.

Figure 2:
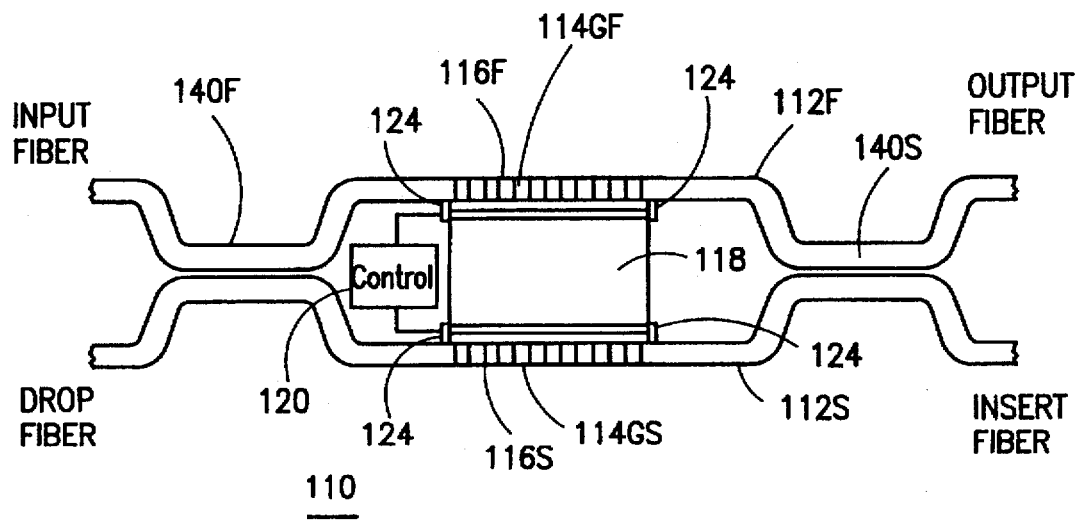
FIG. 2 is a simplified side view of another device used with the present invention.

Turning now to FIG. 2, a dual fiber device 110 has first and second optical fibers 112F and 112S with respective first and second grating portions 114GF and 114GS with gratings 116F and 116S disposed therein. Strain inducing member 118 is a piezoelectric block such as, for example, a 20 mm high PZT-5H unit made by the Electro Ceramics Division of Morgan Matroc Inc., which is bonded to the fibers at points 124. Under control of an electrical signal supplied by power source/strain controller 120, block or member 118 changes the length of the grating portions in the two fibers by the same amount due to the mechanical coupling between the two fibers via block 118. Thus, equal strain is applied to both grating portions in the two fibers.

First and second couplers 140F and 140S are at opposite ends of the grating portions of the two fibers and they function in the same way as couplers 92 and 93 of FIG. 12 of the incorporated by reference parent application. Basically, the fibers 112F and 112S are different arms of an interferometer structure as explained in that application. The structure, which will be referred to herein as a tap, may be used as a switch (i.e., dropping a signal or signals from passage therethrough), for adding a signal to a fiber, both adding and dropping signals, and for the various other purposes described in the parent application. However, unlike the FIG. 12 arrangement of the parent application which used separate strain inducing members for the separate fibers, the mechanical coupling of the two fibers in the present FIG. 2 by use of block 118 as a common strain inducing member may more readily insure that both grating portions are under the same strain. In other words, slight differences in response of two separate strain inducing members (parts of both switches 81 in FIG. 12 of the parent application) which might cause slight variations in strain between the two fibers are avoided by the mechanical (as opposed to electrical) coupling in present FIG. 2.

Various other techniques and structures for applying strain to in-fiber gratings are disclosed in the incorporated by reference concurrently filed application and may also be used for the systems as described herein.

Figure 3:
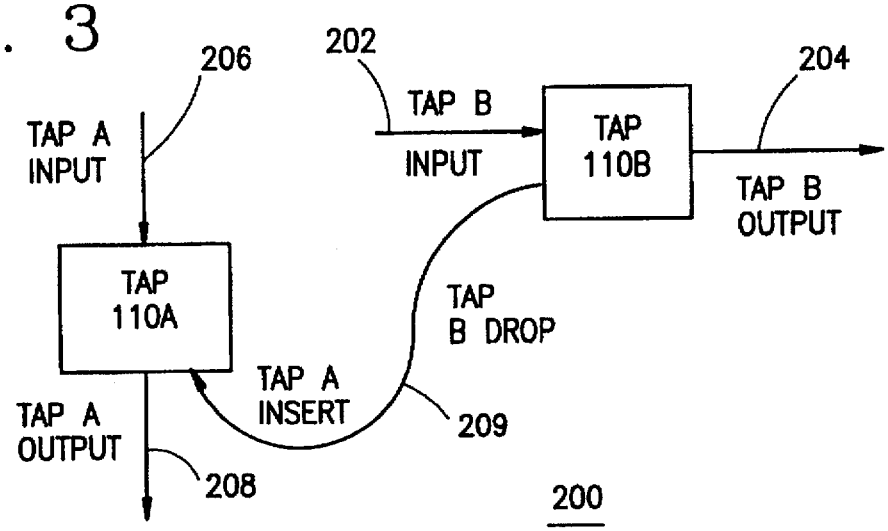
FIG. 3 shows a crossbar switch element of the present invention.

With reference now to FIG. 3, a crossbar optical switch element 200 has two taps 110A and 110B. They may be constructed identically to tap 110 except tap 110A doesn't need a drop fiber extending out from its first coupler and tap 110B doesn't need an insert fiber extending out from its second coupler. Alternately, they could be simpler in construction as discussed below. Basically, tap 110A is used to add signals, whereas tap 110B is used to drop signals, and FIG. 3 therefore shows only three fibers for each tap. For ease of illustration and discussion, fibers related to tap 110A are referred to as tap A fibers, whereas fibers related to tap 110B are referred to as tap B fibers.

Fiber 202 is a tap B input fiber which carries one or more signals into tap 110B. Depending on the state of tap 110B (i.e., the amount of the strain on the in-fiber gratings therein), tap 110B either allows passage of all of the signals on its input fiber to tap B output fiber 204 or causes one or more of the signals on its input fiber 202 to be switched to its drop fiber 209.

Fiber 206 is an input fiber for tap 110B, which tap normally supplies all signals on its input fiber to its output fiber 208. Further, any signal dropped by tap B (i.e., blocked from passage between its input and output fibers) is sent via tap B drop fiber 209 which is also the tap A insert fiber. Thus, the signals dropped from tap B will appear on the tap A output fiber 208. Since tap A is simply adding one or more signals from different fibers, it may be a single simple signal coupler without the gratings, strain inducing device, and second coupler used in tap 110 of FIG. 2, but that will cause a three decibel drop in the signals passing from fiber 206 to fiber 208. More preferably, tap 110A will have gratings, two couplers and a strain inducing device. The strain inducing device will set the strain to reflect signals at the wavelength of the signal or signals which are being inserted. Signals at other wavelengths (i.e., outside of the reflection band) will pass from fiber 206 to fiber 208, while signals within the reflection bandwidth will not be passed from fiber 206 to fiber 208. Instead, they will be reflected. The signal or signals being inserted are within the reflection bandwidth and enter tap 110A and are reflected out the fiber 208.

Figure 4:
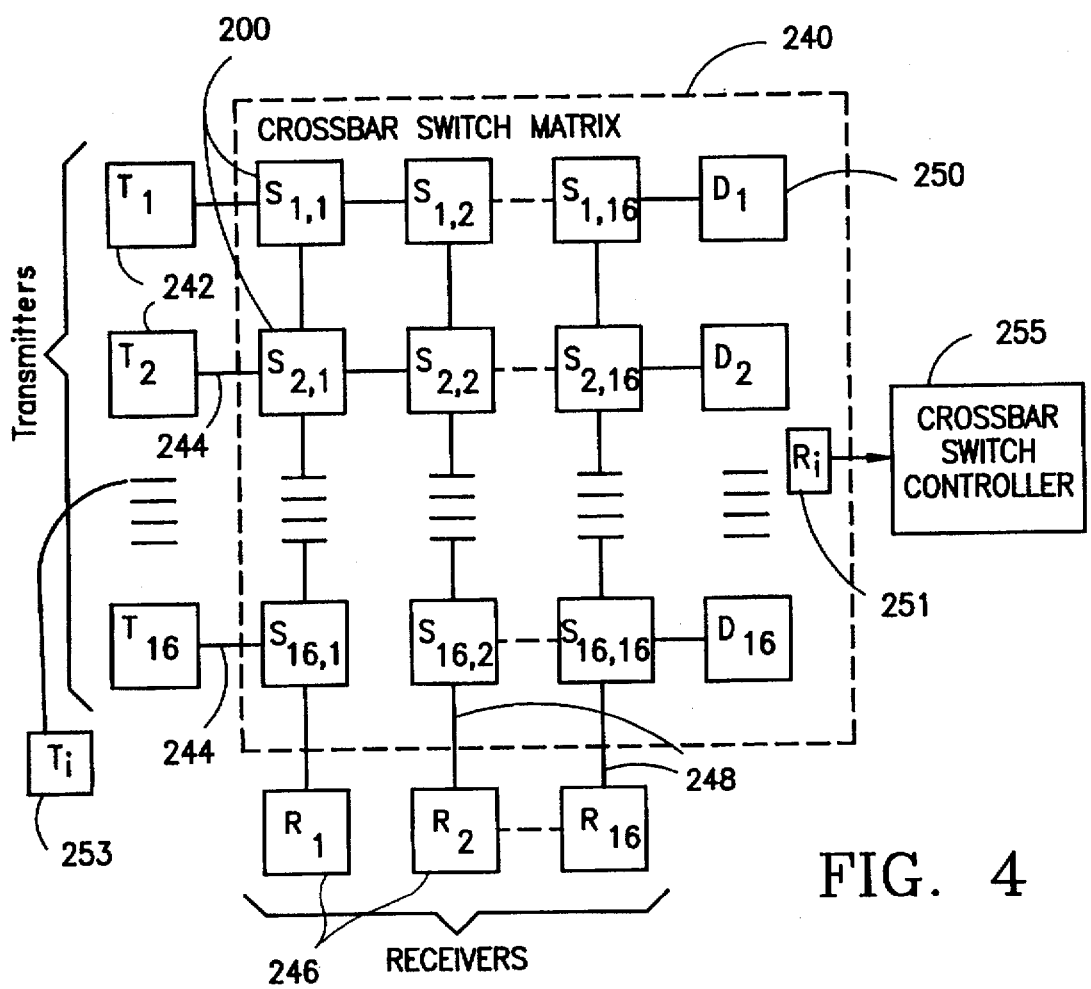
FIG. 4 shows a crossbar switch matrix using the switch elements of FIG. 3 and showing associated components.

Turning now to FIG. 4, a crossbar switch matrix 240 is connected to sixteen optical transmitters 242, also labeled $T_1$ to $T_{16}$ via sixteen matrix input fibers 244 and to sixteen optical receivers 246 via sixteen matrix output fibers 248. (For ease of illustration, not all sixteen of the identically constructed components of FIG. 4 are shown and not all of the identical components are given numbers.) The switch matrix 240 has a two dimensional array of sixteen by sixteen essentially identical switch elements 200 or $Si,j$ where i is the row and j is the column. The switch elements are connected by vertical and horizontal fibers shown as lines. Basically, signals on any of the input fibers 244 can be directed to any of the output fibers 248 except that, of course, two signals at the same wavelength cannot be applied to the same output fiber 248 at the same time without attenuation.

The top row of switch elements $S_{1,j}$ don't need the tap A input fibers like 206. Instead, they receive one or more signals input from the horizontal fibers immediately to their left (which fibers correspond to fiber 202 of FIG. 3). Those signals are passed rightwardly to the horizontal fibers immediately to their right (which fibers correspond to fiber 204 of FIG. 3) except that any signal or signals in the reflection band will be sent to the vertical fiber therebelow (which fibers correspond to fiber 208 of FIG. 3).

Note that an even simpler version of the switch element 200 might be used for the top row. Since the top row doesn't need to pass signals from an upper vertical input fiber to a lower vertical output fiber, the top row switch elements may have tap 110B (without tap 110A). In that case, the drop fiber 209 may connect directly to the corresponding switch element in the second row.

As described, signals from transmitter $T_1$ may be sent down one or more of the vertical fibers. Those not sent down a vertical fiber hit one of devices 250 (sixteen of them labeled $D_1$ to $D_{16}$ corresponding to the sixteen rows) which may be a terminating device simply blocking any reflections therefrom in known fashion. However, the devices 250 could alternately be detectors which are part of one or more receivers 251 (only one shown, preferably one per row) to receive information carried on an input fiber 244 whose associated transmitter may be remote from the crossbar switch matrix 240. For example, transmitter 253 is shown remote from the matrix 240. When information transmitted by remote transceiver 253 is not at a wavelength dropped by taps of the switch elements along the horizontal line from transmitter 253, it may be received by a receiver 251 for forwarding to a crossbar switch controller 255. The information provided by receiver 251 is used to determine the timing of state changes (i.e., turning on and off or otherwise tuning) in the switch elements in the horizontal line corresponding to a given receiver 251. A plurality of such receivers may be used to control the switch elements in each horizontal line or, alternately, a receiver might be included only in those lines corresponding to remote transmitters such as 253 (since a local transmitter can supply the information directly to the controller 255). The controller 255 may control the various switch elements using the strain control techniques discussed above and in the incorporated by reference parent patent and concurrently filed application..

The switch elements in the rows below row one operate in the same fashion as row one except that the vertical fiber entering each switch element Si,j from above corresponds to fiber 206 of FIG. 3. By controlling the various switch elements through the strain inducing techniques or using other tuning techniques, the switch elements will selectively pass vertical signals (i.e., signals on a vertical fiber) vertically downward except signals in the reflection band to the tap A within the switch element. Likewise, the switch elements will selectively pass horizontal signals (i.e., signals on a horizontal fiber) horizontal to the right except signals in the reflection band of the tap B within the switch element. By having the reflection band identical (or essentially identical) for the tap A and tap B parts of a given switch element, a signal in the reflection band is diverted from horizontally entering the right side of a given switch element to vertically leaving that switch element by proceeding vertically downward therefrom.

The greatest flexibility in the switch matrix 240 would have switch elements where each of the taps is tunable over a relatively wide bandwidth such as selecting from one of sixteen bands. However, if desired only one of the taps may be tunable.

Further, switch elements could be used where neither of the taps is tunable for band selection (wavelength selection), but strain inducing or other devices would be used for turning on and off a given tap. For example, the taps could have constant reflection spectra in an on state and be switchable to an off state. The range of tuning of each of the taps is greatly reduced in this case. In that event tuning of the arrangement could be accomplished by tuning one or more of the transmitters $T_1$ to $T_{16}$. For example, the sixteen columns and receivers $R_1$ to $R_{16}$ may be associated with (i.e., have the taps only "on" state permanently set to) corresponding respective wavelengths $W_1$ to $W_{16}$. Whichever transmitter wants to send a signal to receiver $R_1$ will use $W_1$ as its carrier wavelength and that transmitted signal will be passed to receiver $R_1$ by having the switch element in the row corresponding to the transmitter and in column one turned on (i.e., inserting signal on fiber 202 of FIG. 3 to fiber 208 via fiber 209 of FIG. 3). This directs horizontal signals at $W_1$ down from that switch element. Whichever transmitter wants to send a signal to receiver $R_2$ will use $W_2$ as its carrier wavelength and that transmitted signal will be passed to receiver $R_2$, and so forth. Of course, if transmitter $T_2$ is transmitting on $W_1$ and its corresponding switch element $D_{1,2}$ is turned on, this would block any transmissions of signals on $W_1$ from transmitter $T_1$ from going through.

Again, it is preferred to have both the transmitters and the switch elements tunable for wavelength selection (i.e., not limit the switch elements to simply on and off). Having both transmitters and switch elements tunable for wavelength selection allows one to use any transmitter to send signals via any wavelength (i.e., within the possible wavelengths for the matrix 240) to any of the receivers.

Figure 5:
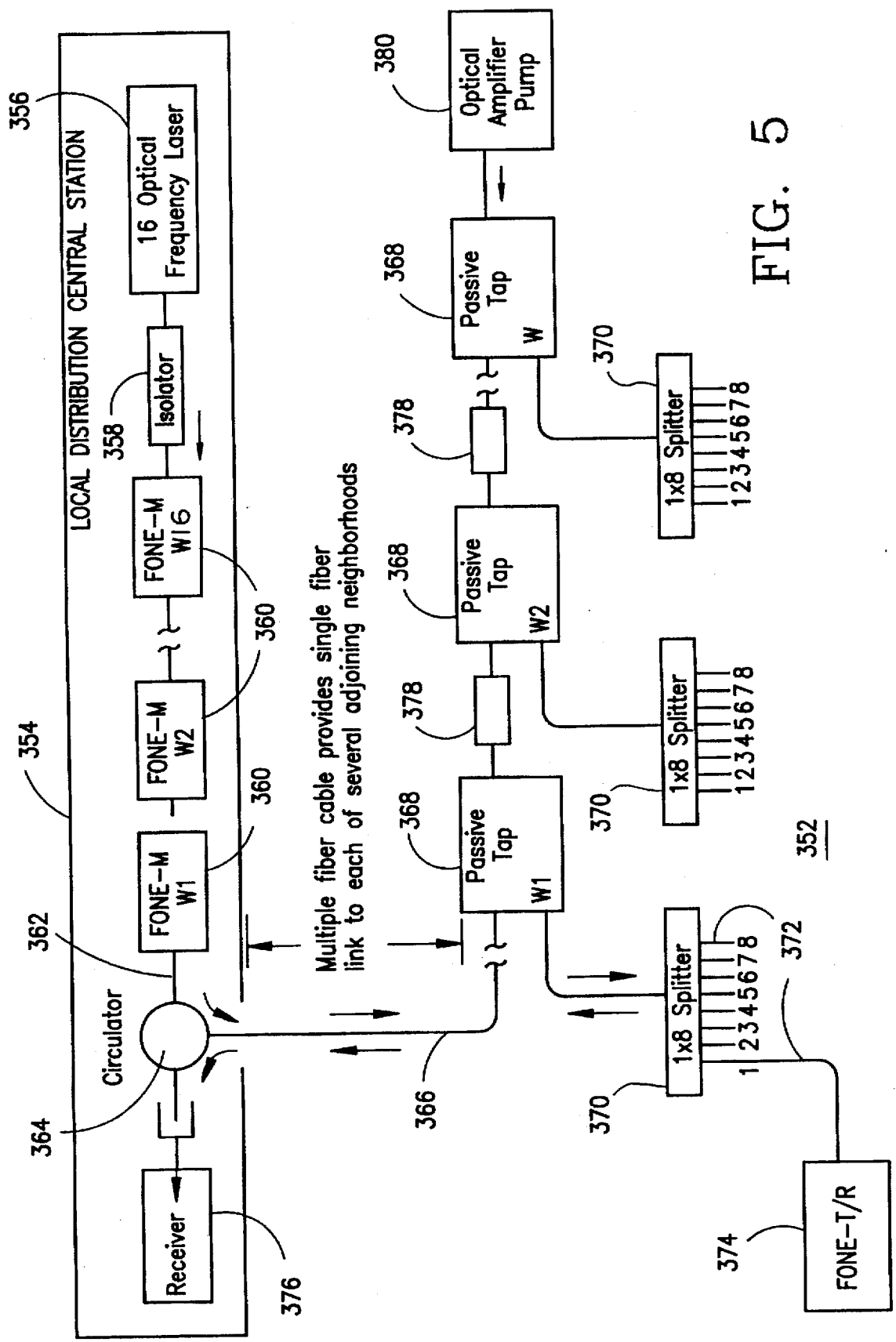
FIG. 5 shows a distribution network according to the present invention.

Turning now to FIG. 5, a local distribution architecture is shown as system 352. It may be a cable television system, integrated services digital network, or other communications system. A central station 354 includes a laser 356 supplying sixteen optical carrier wavelengths or frequencies, via isolator 358, corresponding on a one-to-one basis with sixteen modulators 360 (not all shown). Each modulator 360 (which may be constructed like FIG., 1 of the parent patent or as discussed below) modulates a corresponding carrier wavelength $W_1$ to $W_{16}$ and the modulators are arranged in series such that all of the modulated signals go by fiber 362 to the circulator 364 and pass onto a bidirectional fiber 366 for passage to sixteen passive taps 368 (i.e., they don't need the wavelength selectivity of the taps having strain inducing devices) corresponding on a one-to-one basis with the wavelengths $W_1$ to $W_{16}$. Each tap demultiplexes, with low insertion loss, the signals at the corresponding wavelength to a corresponding splitter 370 which splits the signal into a lower intensity for supplying to one of eight fibers 372. Each of fibers 372 leads to a corresponding transceiver 374 (only one shown for ease of illustration), which transceiver may be constructed as shown and discussed in the incorporated by reference parent patent or may be constructed as discussed below. At any rate, the transceiver receives the signal or signals which are on the optical carrier supplied thereto.

The transceiver 374 may transmit back signals on the same carrier frequency via corresponding fiber 372 to splitter 370 (which acts as a combiner for signals received from fibers 372). Signals entering splitter 370 from fibers 372 are carried by the fiber from 370 to the tap 368 for passage on fiber 366 to circulator 364 and on to the central receiver 376.

The passive taps 368 may have Erbium fibers 378 in between them with a pump laser 380 supplying energy thereto such that signal level strength is maintained. Advantageously, the pump's placement causes it to amplify more on Erbium fibers further from the central station where the signals tend to be more attenuated.

Figure 6:
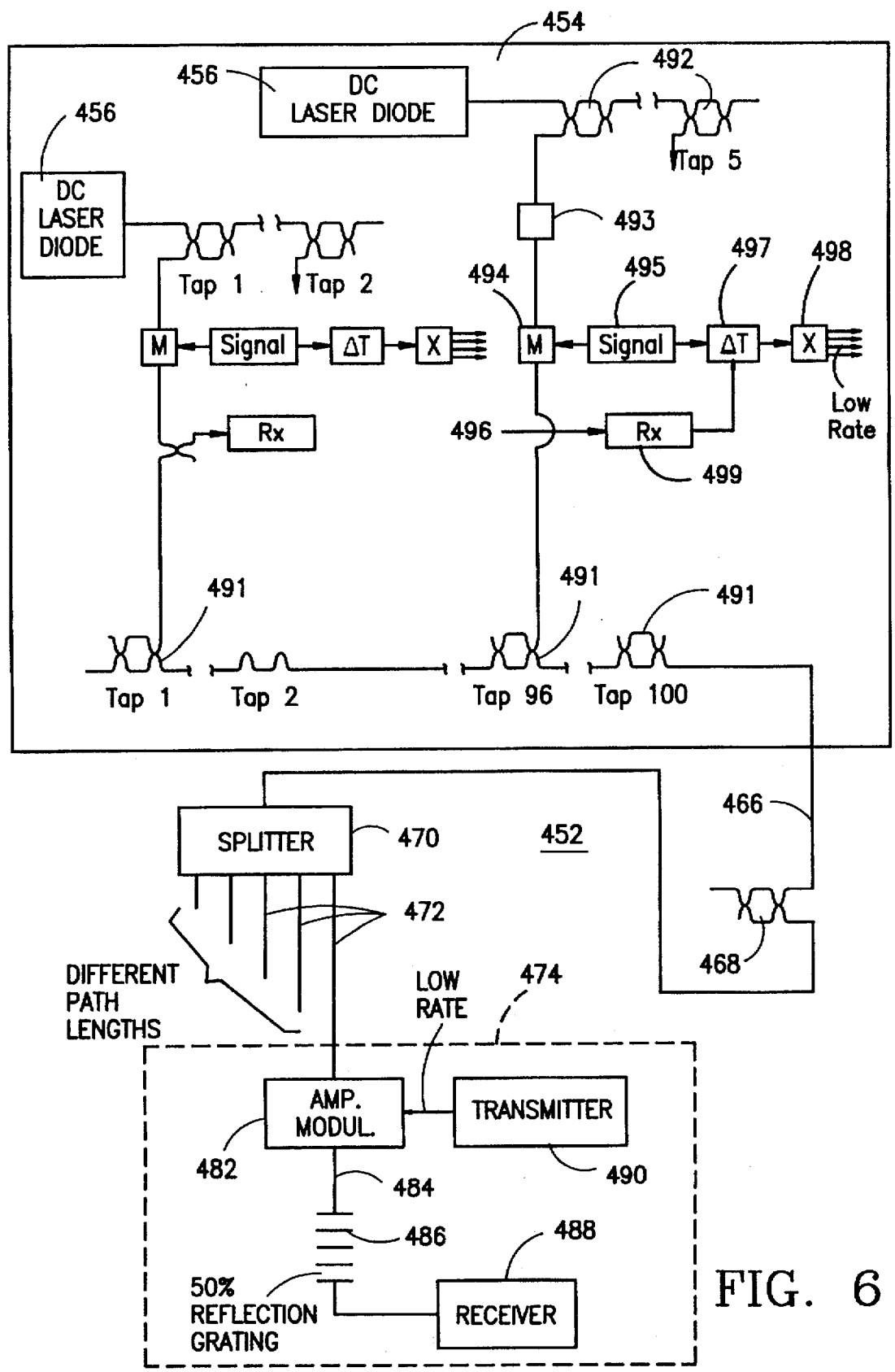
FIG. 6 shows another distribution network according to the present invention.

Turning now to FIG. 6, a distribution network 452 includes lasers 456, taps 468 (only one shown), splitter 470, and fibers 472 functioning like the corresponding components of FIG. 5. FIG. 6 shows details of a possible transceiver construction (only one shown, there would be one for each fiber 472) which uses an advantageous time delay technique based on intentionally introduced differences in the path lengths of the fibers 472 going from the splitters to the transceivers. This results in a difference in round trip transit time between the central station and different subscribers associated with a given one of the taps 468 and corresponding splitters 470. (Although only one tap 468 and one splitter 470 are shown, there would be multiple taps and splitters as in FIG. 5.)

The transceiver 474 directs received signals from the corresponding fiber 472 through an amplitude modulator 482 to fiber 484 and an in-fiber reflection grating 486, which, for example, may reflect fifty percent of the signal back towards the fiber 472 via modulator 482. Signal portions not reflected by 486 go to receiver 488. A transmitter 490 supplies a control signal which overmodulates the reflected signal sent back to the central station 454 at a much lower data rate than the data rate sent by the central station.

The central station 454 is different from central station 354 in that station 454 has various taps 491 which insert outgoing signals on fiber 466 and direct received signals to the appropriate part of central station 454. (Although referred to as a central station, the taps 491 are not necessarily at the same office, building or location.) Further the laser 456 sends signals to taps 492 for reflection, via isolator 493, to amplitude modulator 494, which modulates under control of electrical signal from signal generator 495. The amplitude modulated signal passes to tap 491 via coupler 496. The electrical signal from signal generator 495 is also directed to a time delay element 497 and then to a correlator (demodulator) 498. The correlator 498 also receives an electrical signal recovered by receiver 499 corresponding to the optical signal sent back by reflector 486 and modulator 482. The electrical signal from receiver 499 is the same data as in the signal from generator 495 except that it also incorporates the low data rate modulation from modulator 482. Therefore, correlating the signal from receiver 499 with the time delayed version of the original modulation signal supplied to modulator 494 demodulates and recovers the low rate data placed on the reflected signal by transmitter 490.

In order for the demodulation in correlator 498 to be effective, the time delay introduced by time delay 497 insures that the signal from 495 reaches correlator 498 at the same time as the round trip transit time for the signal between the central office and the subscriber's or customer's transceiver 474. The time delay introduced by component 497 may be controllable to selectively and sequentially check for incoming signals from different customer transceivers. Alternately, and depending on the number of transceivers 474, there could be a time delay element 497, correlator 498, and receiver 499 for each of the transceivers 474. Of course, having a time delay element 497, correlator 498, and receiver 499 for each of the transceivers 474 would not be efficient if there were a large number of transceivers 474, such as one for each subscriber to a cable television system. It will be readily appreciated that the signal path lengths (and thus round trip transit times) in the fibers 472 associated via tap 468 with a given optical carrier wavelength must be sufficiently different that the central station can tell which transceiver 474 is sending a given signal. This can be accomplished by inserted coils or path length extenders in different ones of the fibers 472 to provide a unique path length for each of the fibers 472 connected to a particular splitter 470.

The low rate data can be supplied to the central station for numerous purposes such as indicating pay per view shows a cable television customer wants to watch and could be used for selecting those shows for transmission to the given customer. Such low rate data can also provide the bidirectionality required for a useful voice connection with the customer.

Figure 7:
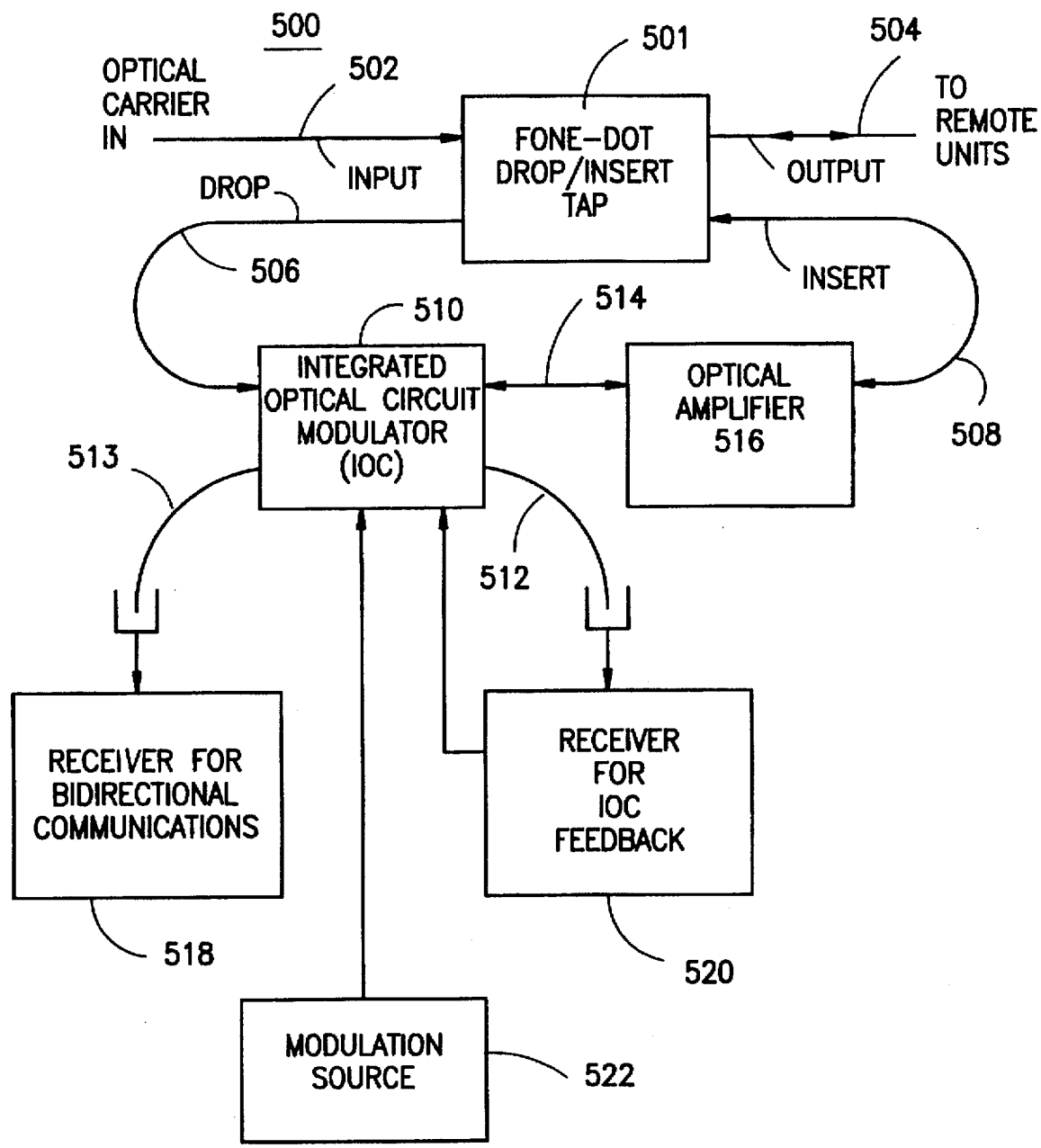
FIG. 7 shows a transceiver unit according to the present invention.

FIG. 7 shows a transceiver 500 which may be used in place of the modulator 360 of FIG. 5, it having already been noted that the modulator could also be realized by the modulator of FIG. 1 of the parent patent. It should also be noted that using the transceiver 500 (which has a modulator therein) in place of the modulator 360 in FIG. 7 would allow FIG. 5 to be constructed without the circulator 364 and receiver 376 since unit 500 may perform both receive and transmit functions.

A FONE (fiber optic network element) DOT (drop-insert optical tap) 501 has input fiber 502, fiber 504, fiber 506, and fiber 508. Fiber 506 carries signals to an integrated optical circuit modulator 510 which is an interferometer having a structure similar to FIG. 12 of the parent patent except that it is biased or controlled such that a signal applied to modulator 510 by fiber 506 will be split evenly between fibers 512 and 514, whereas a signal applied to modulator 510 by fiber 514 is split evenly between fibers 506 and 513. Signals on fiber 512 are supplied to a receiver 520 for feedback purposes, which receiver maintains the modulator 510 in proper mode using known techniques. Fiber 513 carries signals to a receiver 518, which receiver receives signals from remote units. Fiber 514 carries signals in both directions between modulator 510 and an optical amplifier 516 used to compensate for any insertion loss introduced by modulator 510.

An optical carrier supplied via fiber 502 is supplied to tap 501 (which may be constructed like 110 of FIG. 2 or structures disclosed in the parent patent) put on fiber 506 (i.e., dropped), modulated in modulator 510 (based on signals from modulation source 522), and sent back to tap 501 via fibers 514 and 508 and amplifier 516. The modulated carrier is placed on fiber 504 by tap 501. The carrier is dropped, modulated and then reinserted. Thus, a serially arranged number of units 500 may operate like modulators 360 of FIG. 5, each unit 500 having its drop-insert tap 501 corresponding to a different wavelength as explained for modulators 360 of FIG. 5.

Fiber 504 of FIG. 7 carries signals to the remote units, but also functions like fiber 366 of FIG. 5 in that it carries signals back from the remote units. Signals corresponding to the reflection band of tap 501 from the remote units applied to the tap 501 by fiber 504 are directed via fiber 508 to optical amplifier 516 for passage on fiber 514 to modulator 510 and onto receiver 518 via fiber 513.

Figure 8:
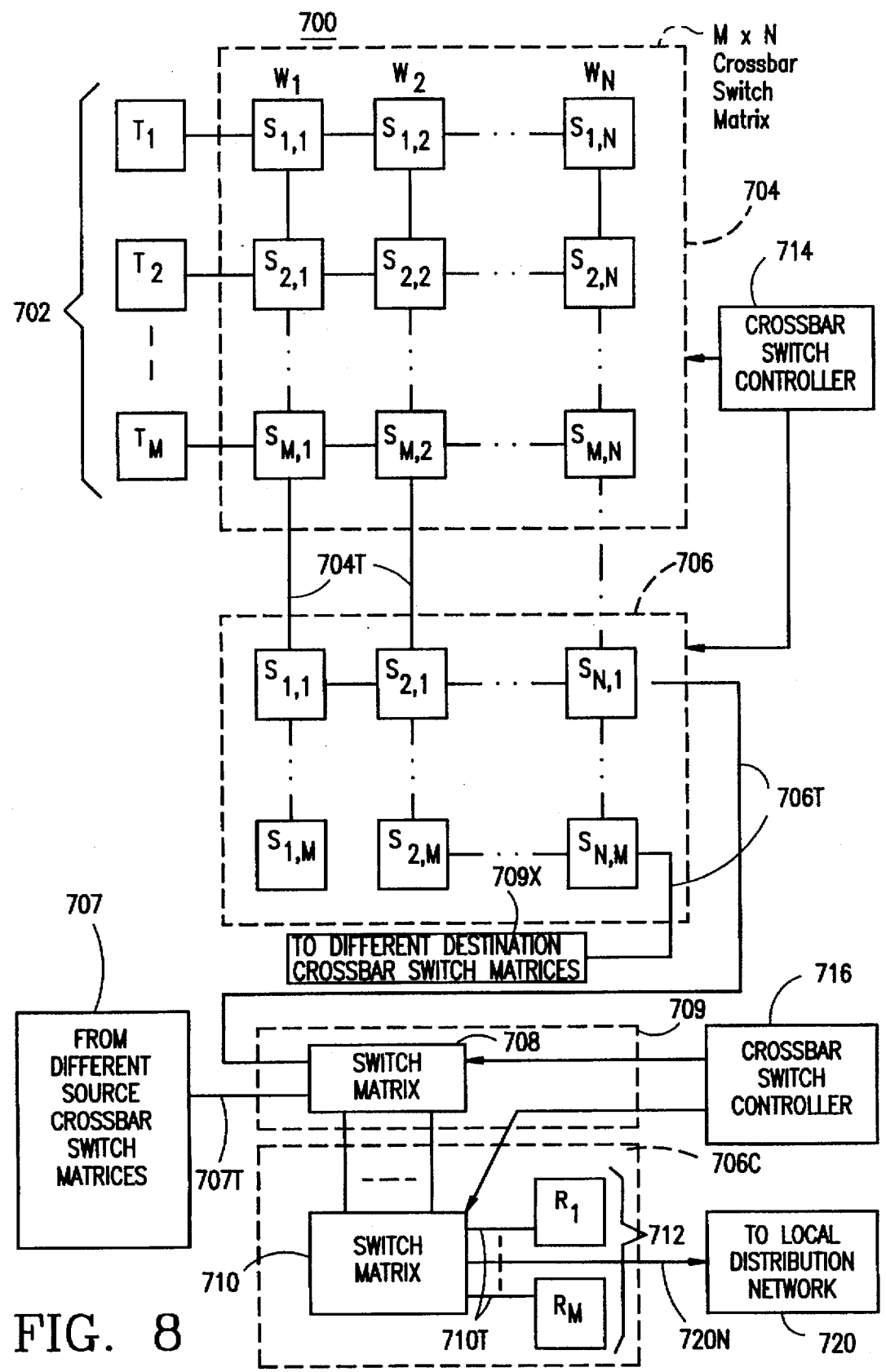
FIG. 8 is a network using multiple of the crossbar switch arrays of FIG. 4.

FIG. 8 shows a system 700 with a plurality of crossbar switching matrices for optical fiber communication. A number of transmitters 702 can transmit on different frequencies. The system 700 may be a packet switched network with transmitters 702 connected to M by N switch matrix 704. If desired, M and N could be equal. Switch matrix 704, like the other switch matrices of FIG. 8, may be constructed like the matrix 240 of FIG. 4. For ease of illustration, the detectors or terminating device such as 250 of FIG. 4 and the receivers such as 251 of FIG. 4 are not shown in the various switch matrices of FIG. 8. Each of the columns of switch elements of switch matrix 704 is associated with a given wavelength W1 to WN such that the output on each of the matrix output fibers 704T will correspond to the corresponding column wavelength. Fibers 704T serve as input fibers to switch matrix 706 which has M output fibers 706T (only two shown).

All or some of fibers 706T lead to switch matrix 708, whose output fibers 708T lead to switch matrix 710. The remaining fibers 706T may lead to other switch matrices as shown diagrammatically as 700X. Since the transit time to the different crossbar switches may be different, one could optionally use the time delay technique of FIG. 6 to sense which signals come from which matrix. Matrix 708 may also receive signals via fibers 707T from other crossbar switch matrices as shown diagrammatically as 707. The output fibers 710T of matrix 710 lead to receivers 712 except that other output fibers such as 710X lead to a local distribution network 720 for local distribution in optical form. The local distribution network 720 may be constructed like the networks of FIGS. 5 and/or 6 and/or portions thereof.

Matrices 704 and 706 operate under control of a transmission crossbar switch controller 714, whereas matrices 706 and 708 operate in similar fashion under control of a receiver crossbar switch controller 716. Although not shown in FIG. 8, matrix 708 and/or matrix 710 may have detectors and receivers such as 250 and 251 respectively of FIG. 4 so as to provide information to the controller 716. The details of communication operation follow, but it will be understood that the controllers supply signals controlling the state of the various switch elements in the same fashion as disclosed for the strain controllers of the concurrently filed application.

The FIG. 8 arrangement has dual pairs of switching matrices such as 704 and 706 at one station and pair 708 and 710 which may be located at another station. Each pair of matrices may be considered as a input matrix (704 at one station, 710 at the other station) and an output matrix (706 at one station, 708 at the other). The FIG. 8 arrangement provides for the routing of incoming signals on M lines to M output fibers with complete interconnect flexibility, subject to modest contention avoidance constraints.

An optical signal entering the top crossbar switching matrix 704 on any of the (horizontal) fibers designated incoming fiber 702T, for example, is demultiplexed onto N (vertical) fibers each dedicated to a different wavelength using wavelength selective taps as described with reference to FIG. 12 of the original patent and FIG. 4 of the present application. The demultiplexed signals on vertical fibers pass through the input crossbar switch matrix 704 into the output crossbar switch matrix 706. At the bottom terminus of each vertical fiber, a receiver (not shown, as discussed relative to receiver 251 of FIG. 4) takes in for local consumption (i.e., for use in controller 714 or otherwise) these signals which were not routed to one of M output fibers 706T in the output switch matrix 706. Signals on output fibers are combined with up to N−1 other signals in the N wavelength multiplexing crossbar switch elements connected to each output fiber. Paired crossbar switch elements in the input and output crossbar matrix act to direct the signal at a given wavelength on a selected input fiber to a selected output fiber. In a preferred embodiment, one or more wavelengths are set aside for transferring optical signal data packet timing information from node to node. This information may be received at a node prior to any switching intelligence being available to the node by allowing the packet timing signal wavelengths to pass through all switches on each incoming line to a receiver (not shown in FIG. 8, but like receiver 251 of FIG. 4) at the fiber end. This packet timing data is then used in a switch control unit, along with similar data from the other incoming lines, to determine the timing of crossbar switch element state changes. At any given instant, only one pair of crossbar switch elements should be diverting signals at any one wavelength. The timing at one wavelength need not be coordinated with the timing at a different wavelength. In the output crossbar switch matrix, each output fiber may have at its starting (left) end a multi-wavelength transmitter as described with reference to FIG. 5 for combining optical signals originating at a given crossbar switch matrix with signals originating at other crossbar switch matrices. In a preferred embodiment, the timing of local origin transmissions is determined by feedback data received from final destination nodes and waypoint routing nodes advising as to what time slots are available for contention-free transmission along the entire transmission path.

The bottom crossbar switching matrix pair 708 and 710 has, for example, input fibers which were among the M output fibers 706T from the top crossbar switch matrix pair. Such input fibers, along with the other input fibers to the bottom node (i.e., corresponding to pair 708 and 710), can have signals directed to any of M output fibers as described with reference to the top crossbar switching pair 704 and 706.

The flexibility of interconnected crossbar switch matrices may be described with reference to an illustrative example. Transmission fibers 706T from matrix pair 704 and 706 (more specifically from 706) may go to different destination crossbar switch matrix pairs such as 709 and 709X. Input transmission lines going to crossbar switch matrix pair 709 may have originated as output transmission lines (e.g., 706T and 707T) from different crossbar switch matrix pairs (704 and 706; 707 illustrated diagrammatically). A transmission line such as 720N may be directed to local distribution network 720 (as described in FIG. 5), instead of a matrix or a receiver 712. Directing a transmission line to a local distribution network allows preservation of signals for local distribution in optical form.

Data from residential customers can be transmitted through the interactive switching network by retransmitting data received back from residences at the local distribution central station via the local transmitters at the (left) terminal end of output fibers in the crossbar switching nodes as described for transmitter 253 of FIG. 4 above.

Signals which have been attenuated by multiple routing events may be boosted by optical amplifiers. Probably the ultimate limit on routing flexibility without retransmission is incremental bandwidth loss which occurs each time a broadband optical signal is reflected by an in-fiber grating.

Although specific constructions have been presented herein, it is to be understood that these are for illustrative purposes only. Various modifications and adaptations will be apparent to those of skill in the art. In view of possible modifications, it will be appreciated that the scope of the present invention should be determined by reference to the claims appended hereto.

What is claimed is:

1. An optical system comprising:
   a first crossbar switch matrix having a plurality of switch elements in an M by N array, each switch element operable for switching optical signals;
   a plurality of first matrix input fibers connected to carry input signals to the first crossbar switch matrix; and
   a plurality of first matrix output fibers connected to carry output signals from the first crossbar switch matrix; and wherein each switch element includes a drop tap operable to drop signals from passage between a drop tap input fiber and a drop tap output fiber such that any dropped signals are applied to a drop tap drop fiber for placement onto one of the first matrix output fibers corresponding to the given switch element and at least a plurality of the switch elements includes an insert tap operable to pass signals from an insert input fiber to an insert output fiber other than signals within a blocked bandwidth and wherein signals within the blocked bandwidth are supplied to the insert output fiber via the drop fiber of the corresponding drop tap and an insert fiber of the insert tap.

2. An optical system comprising a distribution station having a plurality of optical carriers on a single mode fiber with the single mode fiber inputting the signals to a plurality of modulators arranged in series, each modulator modulating at least one of the plurality of optical carriers, a distribution single mode fiber receiving the modulated optical carriers and carrying them to a plurality of taps arranged in series, each tap removing at least one of the modulated optical carriers; and wherein each of the taps is an interferometric tap.

3. An optical system comprising: a distribution station having a modulator modulating an outgoing optical carrier with a modulation signal, a delay through which the modulation signal passes, and a correlator having the delayed modulation signal as a first input; a distribution fiber; and a transceiver station connected to receive the modulated optical carrier via the distribution fiber and having a reflector reflecting a portion of the modulated optical carrier and a modulator receiving the modulated optical carrier and imposing a return modulation on the modulated optical carrier; and wherein the return modulated optical carrier is supplied to the distribution station, the distribution station operable to recover the original modulation signal with the return modulation therewith; and wherein the correlator has a second input which is the original modulation signal with the return modulation therewith; and wherein the return modulation is recovered as an output of the correlator by adjusting the time delay of the delay so as to correspond to a round trip transit time of the optical carrier.

4. An optical system comprising:
a drop-insert tap having input, output, drop, and insert fibers, the input fiber operable to receive an optical carrier which is placed on the drop fiber by the drop-insert tap; and
a modulator connected to the drop fiber and operable to modulate the optical carrier and provide the modulated optical carrier to the insert fiber such that the drop-insert tap places the modulated optical carrier on the output fiber.

* * * * *